(12) United States Patent
Naito et al.

(10) Patent No.: US 9,176,707 B2
(45) Date of Patent: Nov. 3, 2015

(54) ARITHMETIC APPARATUS, ELLIPTIC SCALAR MULTIPLICATION METHOD OF ARITHMETIC APPARATUS, ELLIPTIC SCALAR MULTIPLICATION PROGRAM, RESIDUE OPERATION METHOD OF ARITHMETIC APPARATUS, AND RESIDUE OPERATION PROGRAM

(75) Inventors: Yusuke Naito, Tokyo (JP); Yasuyuki Sakai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 277 days.

(21) Appl. No.: 13/879,715

(22) PCT Filed: Dec. 27, 2010

(86) PCT No.: PCT/JP2010/073620
§ 371 (c)(1),
(2), (4) Date: Apr. 16, 2013

(87) PCT Pub. No.: WO2012/090284
PCT Pub. Date: Jul. 5, 2012

(65) Prior Publication Data
US 2013/0218937 A1    Aug. 22, 2013

(51) Int. Cl.
*G06F 7/00* (2006.01)
*G06F 5/01* (2006.01)
*H04L 9/30* (2006.01)
*H04L 9/32* (2006.01)
*G06F 7/72* (2006.01)

(52) U.S. Cl.
CPC ........ *G06F 5/01* (2013.01); *G06F 7/725* (2013.01); *H04L 9/3066* (2013.01); *H04L 9/3252* (2013.01); *G06F 2207/7261* (2013.01); *H04L 2209/12* (2013.01)

(58) Field of Classification Search
None
See application file for complete search history.

(56) References Cited

U.S. PATENT DOCUMENTS

| 6,738,478 B1 | 5/2004 | Vanstone et al. |
| 6,963,644 B1 | 11/2005 | Matsuzaki et al. |

(Continued)

FOREIGN PATENT DOCUMENTS

| JP | 4 283828 | 10/1992 |
| JP | 2000 353077 | 12/2000 |

(Continued)

OTHER PUBLICATIONS

Coron, J. S., "Resistance against Differential Power Analysis for Elliptic Curve Cryptosystems," C.K. Koc and C. Paar (Eds.): CHES'99, LNCS 1717, pp. 292 to 302, (1999).

(Continued)

*Primary Examiner* — Michael D Yaary
(74) *Attorney, Agent, or Firm* — Oblon, McClelland, Maier & Neustadt, L.L.P.

(57) ABSTRACT

A scalar multiplication unit references a t-bit sequence representing a random number k one bit at a time from the most significant bit, and upon each referencing, sets in a work variable R[0] a value obtained by doubling a specific point G on an elliptic curve set in a scalar multiplication variable R, and sets in a work variable R[1] a value obtained by adding the specific point G to the work variable R[0]. The scalar multiplication unit 122 sets the work variable R[0] in the scalar multiplication variable R if the value of the referenced bit is 0, and sets the work variable R[1] in the scalar multiplication variable R if the value of the referenced bit is 1. A scalar multiple point output unit 123 outputs as a scalar multiple point kG a value obtained by subtracting a constant value 2tG from the scalar multiplication variable R.

8 Claims, 10 Drawing Sheets

(56) References Cited

U.S. PATENT DOCUMENTS

| | | | |
|---|---|---|---|
| 2001/0002486 A1* | 5/2001 | Kocher et al. | 713/171 |
| 2003/0059042 A1 | 3/2003 | Okeya et al. | |
| 2006/0174126 A1* | 8/2006 | Crandall et al. | 713/176 |
| 2007/0064931 A1* | 3/2007 | Zhu et al. | 380/30 |
| 2007/0177721 A1 | 8/2007 | Itoh et al. | |
| 2008/0025500 A1 | 1/2008 | Izu et al. | |
| 2010/0232601 A1* | 9/2010 | Itoh et al. | 380/28 |

FOREIGN PATENT DOCUMENTS

| | | |
|---|---|---|
| JP | 2002 528771 | 9/2002 |
| JP | 2003 98962 | 4/2003 |
| JP | 2004 198566 | 7/2004 |
| WO | 2005 008955 | 1/2005 |
| WO | 2006 077651 | 7/2006 |

OTHER PUBLICATIONS

ISO/IEC JTC 1/SC27 N8181, "Text for ISO/IEC 14888-3:2006/FDAM 1—Information technology—Security techniques—Digital signatures with appendix—Part 3: Discrete logarithm based algorithm—Amendment 1", Project Co-editors (A. Chmora, A. Lunin), Total pp. 36, (Dec. 15, 2009).

International Search Report Issued Mar. 1, 2011 in PCT/JP10/73620 Filed Dec. 27, 2010.

* cited by examiner

ARITHMETIC APPARATUS, ELLIPTIC SCALAR MULTIPLICATION METHOD OF ARITHMETIC APPARATUS, ELLIPTIC SCALAR MULTIPLICATION PROGRAM, RESIDUE OPERATION METHOD OF ARITHMETIC APPARATUS, AND RESIDUE OPERATION PROGRAM

TECHNICAL FIELD

This invention relates, for example, to an arithmetic apparatus for generating an electronic signature of elliptic curve cryptography, an elliptic scalar multiplication method of an arithmetic apparatus, an elliptic scalar multiplication program, a residue operation method of an arithmetic apparatus, and a residue operation program.

BACKGROUND ART

There is a technique of using an electronic signature for verifying an author of electronic data.

The electronic signature is created by a specific signature generation algorithm by using electronic data, a secret key, and a random number. The electronic signature is communicated together with the electronic data.

A receiver of the electronic data verifies the electronic data by a specific signature verification algorithm by using the received electronic data, the received electronic signature, and a public key of a signer. That is, the receiver of the electronic data determines whether or not the received electronic signature was generated by using the secret key corresponding to the public key. Then, if the received electronic signature was generated by using the secret key corresponding to the public key, it is verified that the received electronic data was created by an owner of the secret key (the signer).

Thus, if the secret key is disclosed to another person, there is a risk that the electronic signature may be forged and electronic data may be communicated by another person posing as the owner of the secret key.

If the random number used in generating the electronic signature is disclosed to another person, the secret key may be identified based on the electronic signature and the random number.

Thus, as in the case of disclosure of the secret key, the electronic signature may be forged and electronic data may be communicated by another person posing as the owner of the secret key.

By performing timing analysis of processing time of an arithmetic process for generating an electronic signature, it may be possible to obtain a numerical value (for example, a secret key or a random number) used in the arithmetic process (see Non-Patent Literature 1).

For example, in a signature generation algorithm (and a signature verification algorithm) of elliptic curve cryptography, such as EC-Schnorr or ECDSA, an elliptic scalar multiplication kG is performed by which a point G on an elliptic curve is scalar-multiplied by a random number k. The signature generation algorithm (and the signature verification algorithm) is discussed in Non-Patent Literature 2.

A conventional elliptic scalar multiplication kG is performed as shown below.

[Formula 1]
Step 1. R=G;
Step 2. i=t−1, then repeat Steps 2-1 to 2-4 until i=0;
  Step 2-1. R[0]=2R;
  Step 2-2. R[1]=R[0]+G;
  Step 2-3. R=R[k[i]];
  Step 2-4. i - - -;
Step 3. Return R;
where
t: bit count of k
k[i]: bit value of the i-th bit from the least significant bit
R[k[i]]: R[0] if k[i]=0, or R[1] if k[i]=1.

The above computation method will be called an Add-Double-Always method.

In the Add-Double-Always method, k[t] must be 1. Thus, a bit count t of the random number k varies depending on the value of the random number k. For example, assume that the random number k is represented by 32 bits. If the most significant bit of the random number k is 1, the bit count t is "32". If the most significant 12 bits of the random number k are 0, the bit count t changes to "20(=32−12)".

That is, computation time varies depending on the value of the random number k, and it may be possible to identify the random number k by timing analysis.

An elliptic scalar multiplication kG based on a modified Add-Double-Always method is shown below.

[Formula 2]
Step 1. R=0;
Step 2. i=t, then repeat Steps 2-1 to 2-4 until i=0;
  Step 2-1. R[0]=2R;
  Step 2-2. R[1]=R[0]+G;
  Step 2-3. R=R[k[i]];
  Step 2-4. i - - -;
Step 3. Return R;

In the above computation method, k[t] does not have to be 1. Thus, the bit count t of the random number k is a fixed value, not varying with the value of the random number k.

However, in Step 2-1, if the most significant bit of the random number k is 1, doubling of a variable R that is an infinite point (R=0) is performed only once. If a plurality of most significant bits are 0, the doubling of the variable R that is the infinite point is performed a plurality of times. Further, computation time varies between the doubling of the variable R that is the infinite point and the doubling of the variable R that is not the infinite point.

Thus, the computation time varies depending on the value of the random number k, and it may be possible to identify the random number k by timing analysis.

In the signature generation algorithm (and the signature verification algorithm) of elliptic curve cryptography, it is necessary to perform a multiple-precision operation process.

A residue operation "a/2 mod p" performed in the multiple-precision operation process is shown below, where "a" represents a multiple-precision integer, "p" represents a prime number, and "mod" represents a residue operator.

[Formula 3]
Step 1. if a is even, then c=a>>1;
Step 2. else c=a+p;c=c>>1;
Step 3. Return c; [Formula 3]
where
x>>1: right-shift by 1 bit the bit sequence x.

In the above residue operation, if "a" is even, a shift operation is performed once. If "a" is odd, a shift operation and an addition are each performed once.

That is, computation time varies depending on the value of "a", and it may be possible to identify "a" by timing analysis and to identify the random number k based on "a".

A zero determination operation performed in the multiple-precision operation process is shown below. The zero determination operation determines whether or not the value of a multiple-precision integer b is zero. The multiple-precision integer b is expressed as a value in which a plurality of words (integer values) are concatenated.

[Formula 4]

Process: Determine whether or not a word in "b" is zero sequentially from the most significant word.

Condition 1: If a word is non-zero, determine that "b" is non-zero, and end.

Condition 2: If all words are zero, determine that "b" is zero, and end.

In the above zero determination operation, the nearer the position of a non-zero word is to the most significant word, the shorter computation time becomes.

That is, the computation time varies depending on the value of "b", and it may be possible to identify the random number k by timing analysis.

CITATION LIST

Non-Patent Literature

Non-Patent Literature 1: Jean-Sebastien Coron: Resistance against Differential Power Analysis for Elliptic Curve Cryptosystems. CHES 1999: 292-302

Non-Patent Literature 2: ISO/IEC JTC 1/SC 27

DISCLOSURE OF INVENTION

Technical Problem

An object of the present invention is, for example, to prevent timing analysis by processing an arithmetic process for generating an electronic signature in a fixed amount of computation time regardless of differences in numerical values used in the arithmetic process.

Solution to Problem

An arithmetic apparatus of the present invention calculates a coordinate value kG obtained by scalar multiplication of a coordinate value G of a specific point included in an elliptic curve by a multiplier value k represented by a t-bit bit sequence.

The arithmetic apparatus includes a constant storage unit that pre-stores a coordinate value $2^t G$ obtained by scalar multiplication of the coordinate value G of the specific point by 2 to a power of t;

an initial setting unit that sets the coordinate value G of the specific point in a scalar multiplication variable R;

a scalar multiplication unit that references the t-bit bit sequence representing the multiplier value k in units of a predetermined number of bits from a most significant bit, and each time the predetermined number of bits of the bit sequence are referenced, sets in a zeroth work variable R[0] a coordinate value obtained by doubling the scalar multiplication variable R, sets in a first work variable R[1] a coordinate value obtained by adding a coordinate value of multiplying the coordinate value G of the specific point by a predetermined number to the coordinate value set in the zeroth work variable R[0], sets the zeroth work variable R[0] in the scalar multiplication variable R if a value of the predetermined number of bits referenced is zero, and sets the first work variable R[1] in the scalar multiplication variable R if the value of the predetermined number of bits referenced is non-zero;

a scalar multiple point output unit that performs a subtraction of the coordinate value $2^t G$ stored in the constant storage unit from the scalar multiplication variable R set by the scalar multiplication unit, and outputs a coordinate value obtained by the subtraction as the coordinate value kG; and a multiple-precision residue operation unit that calculates as a residue value r a remainder that is obtained when a value obtained by dividing a multiple-precision integer a by two is divided by a prime number p, the multiple-precision residue operation unit setting 0 in a temporary variable temp if the multiple-precision integer a is even, setting the prime number p in the temporary variable temp if the multiple-precision integer a is odd, setting in a residue operation variable c a value obtained by adding the temporary variable temp to the multiple-precision integer a, and outputting as the residue value r a value obtained by right-shifting by 1 bit the residue operation variable c that is set.

The initial setting unit sets a multiple-precision integer representing the coordinate value G of the specific point in the scalar multiplication variable R.

The scalar multiplication unit, using the multiple-precision residue operation unit, calculates the coordinate value obtained by doubling the scalar multiplication variable R and the coordinate value obtained by adding the coordinate value G of the specific point to the zeroth work variable R[0].

The scalar multiple point output unit, using the multiple-precision residue operation unit, calculates the coordinate value obtained by subtracting the coordinate value $2^t G$ from the scalar multiplication variable R.

Advantageous Effects of Invention

According to the present invention, an elliptic scalar multiplication kG can be processed in a fixed amount of computation time regardless of the value of a random number k (multiplier value), and timing analysis of the elliptic scalar multiplication kG can be prevented.

DESCRIPTION OF PREFERRED EMBODIMENTS

First Embodiment

An elliptic curve cryptographic apparatus that generates an electronic signature by using an elliptic curve cryptographic scheme will be described.

Generation of an electronic signature is an example of a cryptographic process using the elliptic curve cryptographic scheme.

Figure 1:
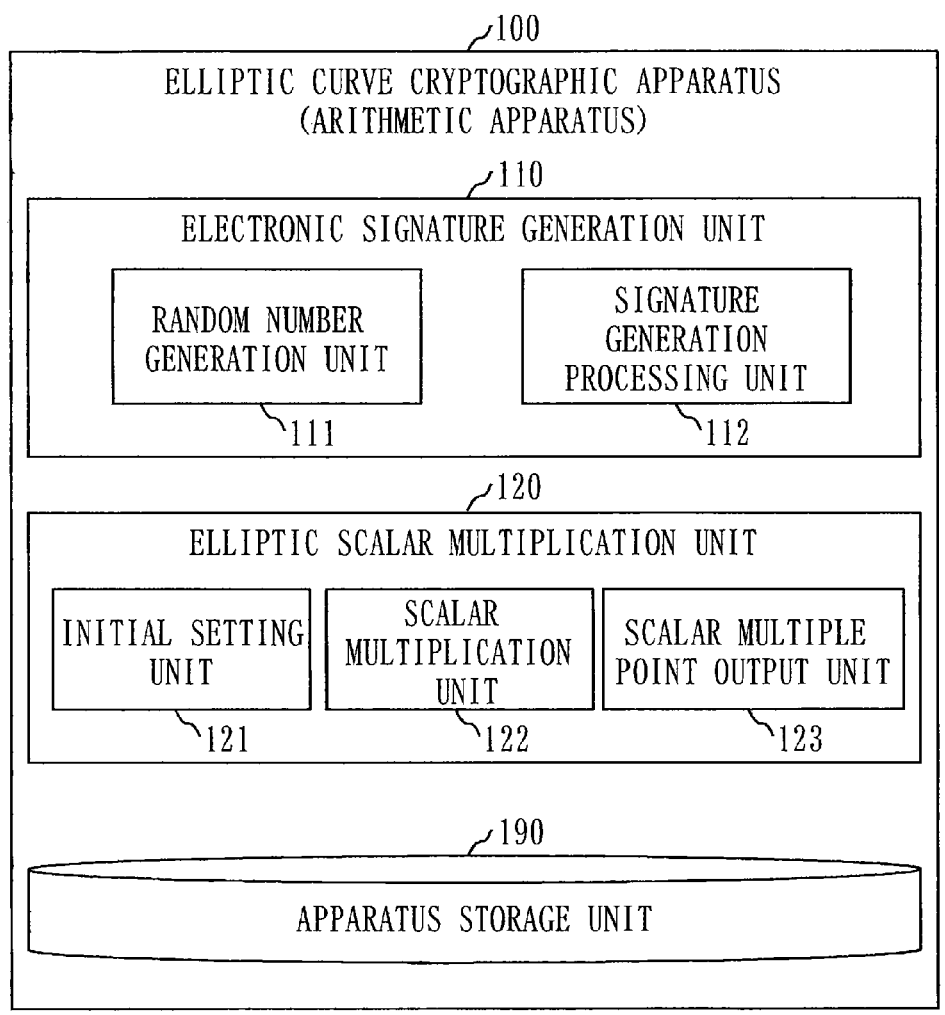
FIG. 1 is a configuration diagram of an elliptic curve cryptographic apparatus 100 in a first embodiment.

FIG. 1 is a configuration diagram of an elliptic curve cryptographic apparatus 100 in a first embodiment.

Referring to FIG. 1, a configuration of the elliptic curve cryptographic apparatus 100 in the first embodiment will be described.

The elliptic curve cryptographic apparatus 100 (arithmetic apparatus) includes an electronic signature generation unit 110, an elliptic scalar multiplication unit 120, and an apparatus storage unit 190.

The electronic signature generation unit 110 executes a signature generation algorithm using elliptic curve cryptography, such as EC-Schnorr or ECDSA (see Non-Patent Literature 2), and generates an electronic signature.

The electronic signature generation unit 110 includes a random number generation unit 111 and a signature generation processing unit 112.

The random number generation unit 111 generates (calculates) a random number k by a predetermined random number generation process.

The random number k is a value represented by a t-bit bit sequence.

The signature generation processing unit 112 generates an electronic signature by using a coordinate value kG calculated by the elliptic scalar multiplication unit 120.

The elliptic scalar multiplication unit 120 calculates the coordinate value kG which is obtained by scalar multiplication of a coordinate value G of a specific point included in a specific elliptic curve by the random number k (multiplier value) generated by the random number generation unit 111.

The elliptic scalar multiplication unit 120 includes an initial setting unit 121, a scalar multiplication unit 122, and a scalar multiple point output unit 123.

The initial setting unit 121 sets the coordinate value G of the specific point in a predetermined scalar multiplication variable R.

The scalar multiplication unit 122 references the t-bit bit sequence representing the random number k in units of a predetermined number of bits (1 bit or a plurality of bits) from the most significant bit.

Upon referencing each predetermined number of bits of the bit sequence, the scalar multiplication unit 122 sets a coordinate value obtained by doubling the scalar multiplication variable R in a predetermined zeroth work variable R[0].

The scalar multiplication unit 122 sets, in a predetermined first work variable R[1], a coordinate value that is obtained when a coordinate value obtained by multiplying the coordinate value G of the specific point by a predetermined number (1 or larger) is added to the value set in the zeroth work variable R[0].

If the value of the predetermined number of bits referenced is zero, the scalar multiplication unit 122 sets the zeroth work variable R[0] in the scalar multiplication variable R. If the value of the predetermined number of bits referenced is non-zero, the scalar multiplication unit 122 sets the first work variable R[1] in the scalar multiplication variable R.

The scalar multiple point output unit 123 performs a subtraction of a coordinate value $2^r G$ from the scalar multiplication variable R set by the scalar multiplication unit 122, and outputs a coordinate value obtained by the subtraction as the coordinate value kG.

The coordinate value $2^r G$ is a value obtained by scalar multiplication of the coordinate value G of the specific point by 2 to the power of t.

The apparatus storage unit 190 stores various types of data used in the elliptic curve cryptographic apparatus 100.

The coordinate value G of the specific point, an order n of the coordinate value G of the specific point, a secret key d, the coordinate value $2^r G$, a message M, the random number k, and the electronic signature are examples of data stored in the apparatus storage unit 190.

The coordinate value G of the specific point, the order n of the coordinate value G of the specific point and the secret key d are pre-stored in the apparatus storage unit 190. The coordinate value G of the specific point is also referred to as the "elliptic curve sine value".

The coordinate value $2^r G$ is pre-computed based on the coordinate value G of the specific point and is stored in the apparatus storage unit 190.

The message M is input to the elliptic curve cryptographic apparatus 100 and is stored in the apparatus storage unit 190. The random number k is calculated by the random number generation unit 111 and is stored in the apparatus storage unit 190. The electronic signature is generated by the signature generation processing unit 112 and is stored in the apparatus storage unit 190.

The coordinate value G of the specific point will be hereinafter described as the "specific point G". The coordinate value $2^r G$ will be described as the "constant value $2^r G$". The coordinate value kG will be described as the "scalar multiple point kG".

Figure 2:
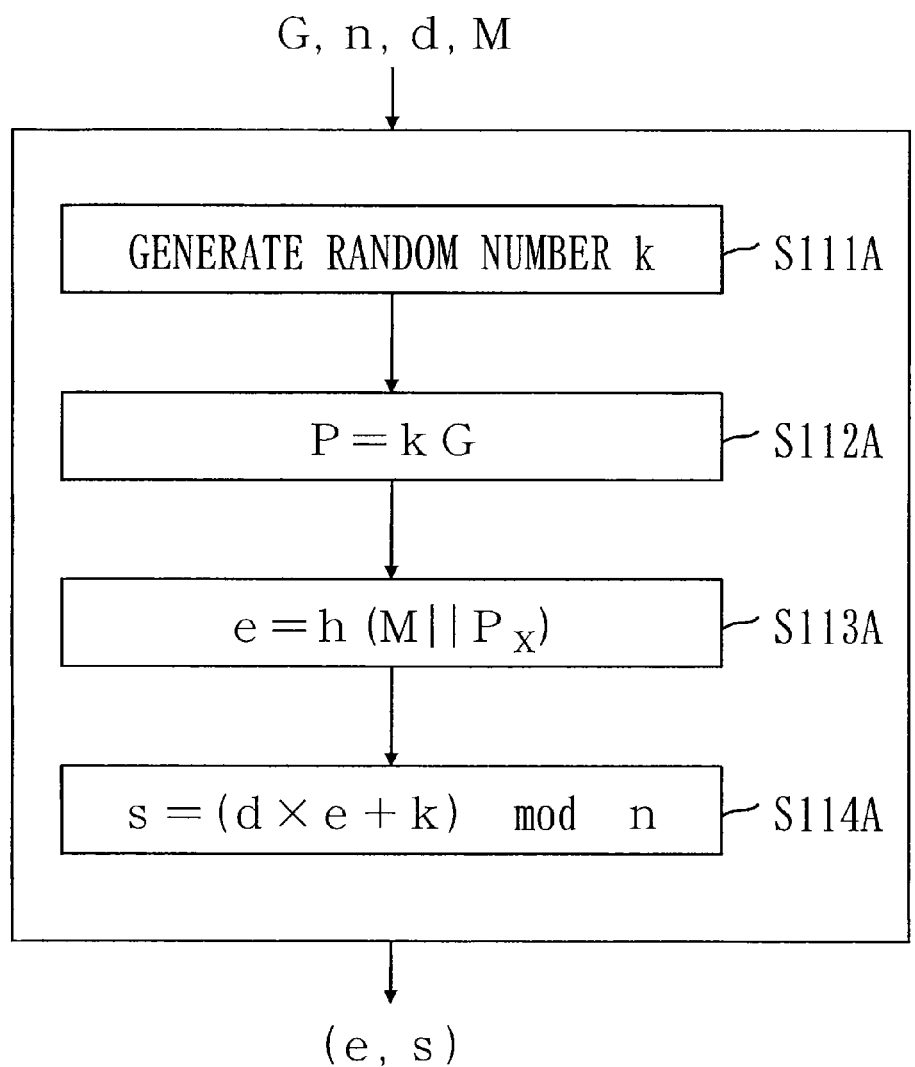
FIG. 2 is a flowchart illustrating an electronic signature generation method (EC-Schnorr scheme) in the first embodiment.

FIG. 2 is a flowchart illustrating an electronic signature generation method (EC-Schnorr scheme) in the first embodiment.

Referring to FIG. 2, the electronic signature generation method by the EC-Schnorr scheme will be described.

The electronic signature generation unit 110 inputs from the apparatus storage unit 190 the specific point G, the order n of the specific point G, the secret key d, and the message M. Using the specific point G, the order n of the specific point G, and the secret key d, the electronic signature generation unit 110 generates (calculates) an electronic signature (e, s) corresponding to the message M as described below.

In S111A, the random number generation unit 111 executes the predetermined random number generation process and generates (calculates) the random number k. The random number k is a natural number less than the order n of the specific point G After S111A, processing proceeds to S112A.

In S112A, the signature generation processing unit 112 inputs to the elliptic scalar multiplication unit 120 the random number k generated in S111A and the specific point G input from the apparatus storage unit 190.

Then, the signature generation processing unit 112 sets the scalar multiple point kG calculated by the elliptic scalar multiplication unit 120 in a predetermined variable P. The variable P will be hereinafter referred to as the "scalar multiple point P", How the elliptic scalar multiplication unit 120 calculates the scalar multiple point kG will be described separately as an "elliptic scalar multiplication method".

After S112A, processing proceeds to S113A.

In S113A, using as an input value a message M'(=M∥Px) which is a concatenation of the message M and an x coordinate value Px of the scalar multiple point P, the signature generation processing unit 112 computes a predetermined hush function h and calculates a hush value e.

In the embodiment, "A∥B" means a concatenation of A and B, and "h(C)" means a hush function for calculating a hash value of an input value C.

After S113A, processing proceeds to S114A.

In S114A, the signature generation processing unit 112 calculates a remainder of dividing (d×e+k) by the order n of the specific point G The remainder calculated in S114 will be hereinafter described as the "residue value s".

In the embodiment, "A mod B" means an operation that obtains a remainder of dividing A by B.

The signature generation processing unit 112 outputs a combination (e, s) of the hash value e calculated in S113A and the residue value s calculated in S114A as the electronic signature of the message M.

S114A completes the electronic signature generation process by the EC-Schnorr scheme.

Figure 3:
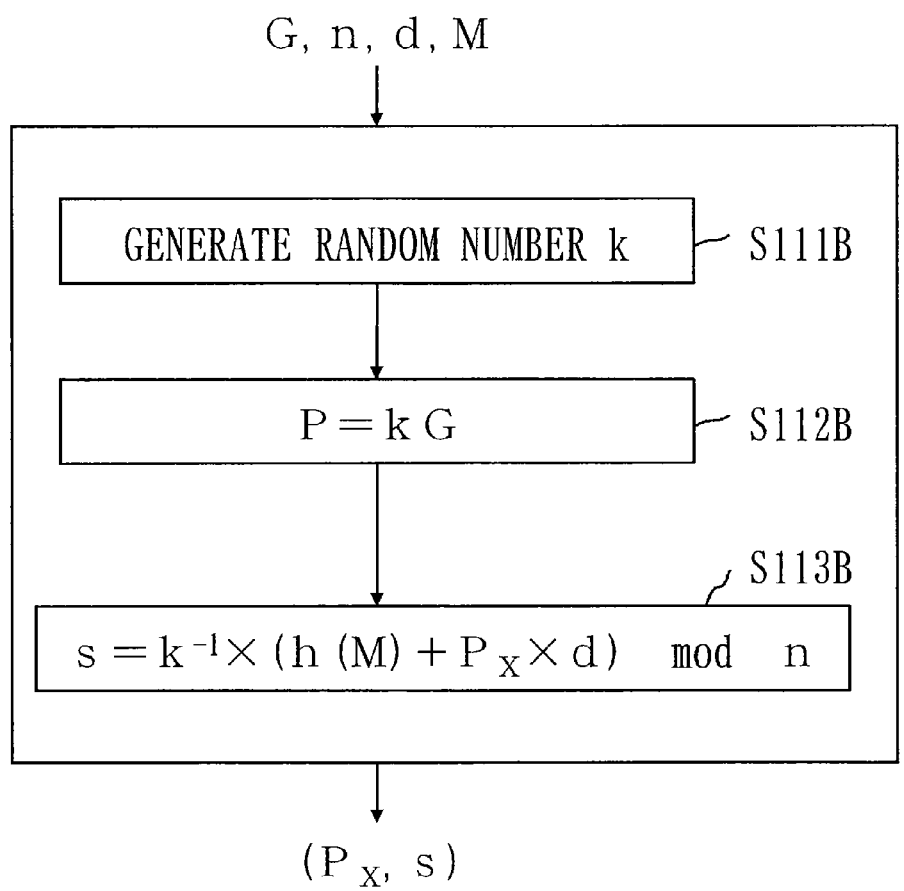
FIG. 3 is a flowchart illustrating an electronic signature generation method (ECDSA scheme) in the first embodiment.

FIG. 3 is a flowchart illustrating an electronic signature generation method (ECDSA scheme) in the first embodiment.

The electronic signature generation unit 110 may generate an electronic signature by the ECDSA scheme as shown in FIG. 3.

The electronic signature generation unit 110 inputs from the apparatus storage unit 190 the specific point G, the order n of the specific point G, the secret key d, and the message M. Using the specific point G, the order n of the specific point G, and the secret key d, the electronic signature generation unit 110 generates (calculates) an electronic signature (Px,s) corresponding to the message M as described below.

In S111B, the random number generation unit 111 executes the predetermined random number generation process and generates (calculates) the random number k.

After S111B, processing proceeds to S112B.

In S112B, the signature generation processing unit 112 inputs to the elliptic scalar multiplication unit 120 the random number k generated in S111B and the specific point G input from the apparatus storage unit 190.

Then, the signature generation processing unit 112 sets the scalar multiple point kG calculated by the elliptic scalar multiplication unit 120 in the predetermined variable P (scalar multiple point P).

How the elliptic scalar multiplication unit 120 calculates the scalar multiple point kG will be described separately as the "elliptic scalar multiplication method".

After S112B, processing proceeds to S113B.

In S113B, the signature generation processing unit 112 calculates the residue value s, and outputs a combination (Px,s) of the x coordinate value Px of the scalar multiple point P and the residue value s as the electronic signature of the message M.

A formula for computing the residue value s can be expressed as:

$$s = k^{-1} \times (h(M) + Px \times d) \bmod n$$

S113B completes the electronic signature generation process by the ECDSA scheme.

The EC-Schnorr scheme (FIG. 2) and the ECDSA scheme (FIG. 3) are discussed in detail in Non-Patent Literature 2.

Figure 4:
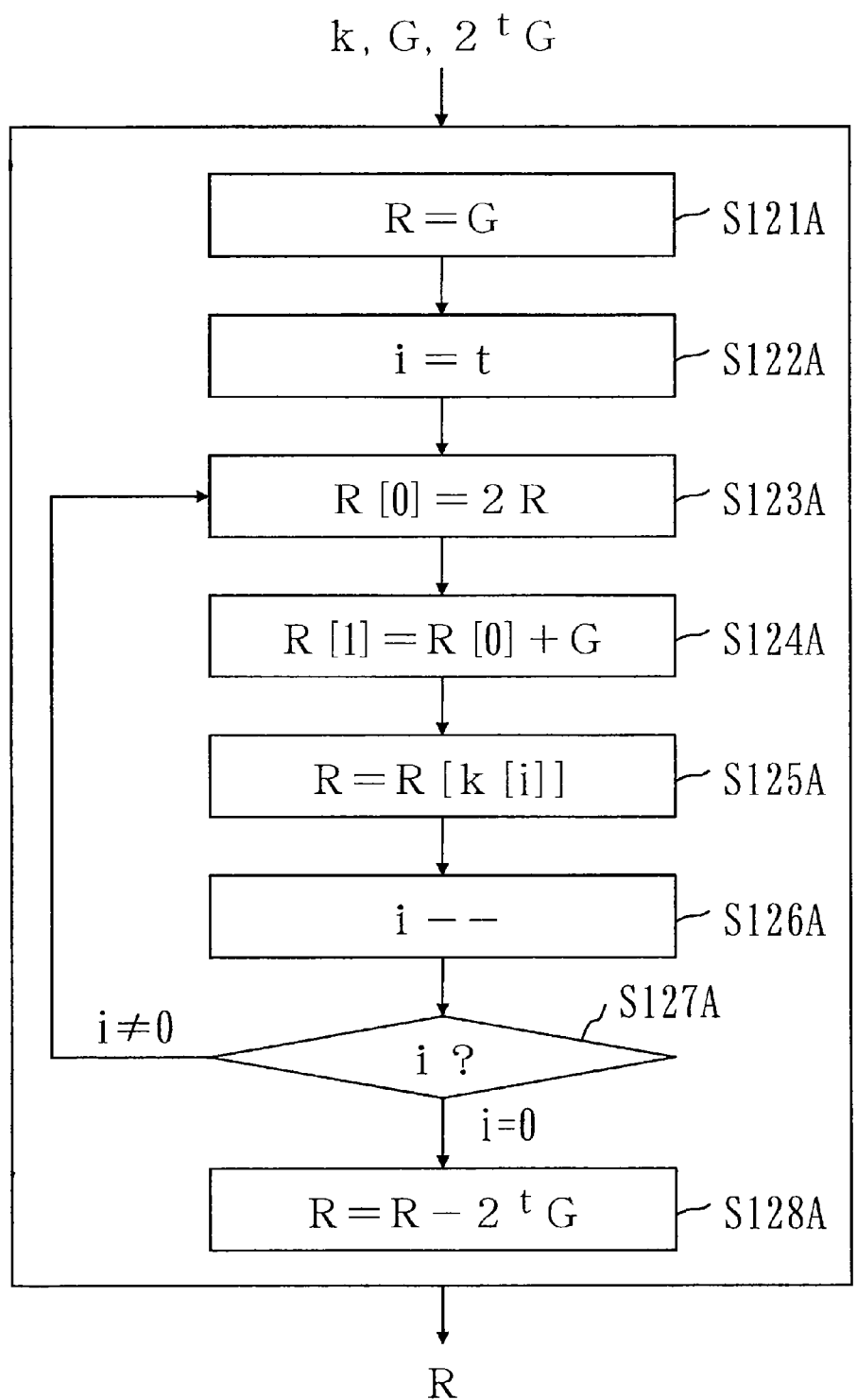
FIG. 4 is a flowchart illustrating an elliptic scalar multiplication method in the first embodiment.

FIG. 4 is a flowchart illustrating the elliptic scalar multiplication method in the first embodiment.

Referring to FIG. 4, the elliptic scalar multiplication method in the first embodiment will be described.

The elliptic scalar multiplication unit 120 inputs from the electronic signature generation unit 110 the random number k and the specific point G, inputs from the apparatus storage unit 190 the constant value $2^r G$, and calculates the scalar multiple point kG as described below.

In S121A, the initial setting unit 121 sets the specific point G in a predetermined variable R. The variable R will be hereinafter referred to as the "scalar multiplication variable R".

After S121A, processing proceeds to S122A.

In S122A, the scalar multiplication unit 122 sets a bit count t of the bit sequence representing the random number k in a predetermined variable i. The variable i will be hereinafter referred to as the "loop variable i".

For example, when the variable (bit sequence) representing the value of the random number k is a 32-bit variable, the scalar multiplication unit 122 sets "32" in the loop variable i.

The value (bit value) of the i-th bit from the least significant bit of the bit sequence representing the random number k will be hereinafter described as "k[i]".

That is, the bit value of the most significant bit of the random number k is "k[t]", and the bit value of the least significant bit of the random number k is "k[1]". The most significant bit is the leftmost bit representing 2 to the power of t. The least significant bit is the rightmost bit representing 2 to the power of 0.

The bit value k[t] of the most significant bit of the random number k may be either "0" or "1".

After S122A, processing proceeds to S123A.

In S123A, the scalar multiplication unit 122 doubles the scalar multiplication variable R, and sets an obtained value "2R" in a predetermined variable R[0]. The variable R[0] will be hereinafter referred to as the "zeroth work variable R[0]".

After S123A, processing proceeds to S124A.

In S124A, the scalar multiplication unit 122 performs an addition of the specific point G to the value set in the zeroth work variable R[0], and sets a value obtained by the addition in a predetermined variable R[1]. The variable R[1] will be hereinafter referred to as the "first work variable R[1]".

After S124A, processing proceeds to S125A.

In S125A, based on the loop variable i, the scalar multiplication unit 122 references the bit value k[i] of the i-th bit from the least significant bit of the random number k.

For example, when "i=t", the scalar multiplication unit 122 references the most significant bit k[t] of the random number k. When "i=1", the scalar multiplication unit 122 references the least significant bit k[1] of the random number k.

If the bit value k[i] is "0", the scalar multiplication unit 122 sets the zeroth work variable R[0] in the scalar multiplication variable R.

If the bit value k[i] is "1", the scalar multiplication unit 122 sets the first work variable R[1] in the scalar multiplication variable R.

After S125A, processing proceeds to S126A.

In S126A, the scalar multiplication unit 122 subtracts "1" from the loop variable i.

After S126A, processing proceeds to S127A.

In S127A, the scalar multiplication unit 122 determines whether or not the loop variable i is "0".

If the loop variable i is "0", processing proceeds to S128A.

If the loop variable i is not "0", processing returns to S123A.

However, it may be arranged that the determination of S127A is performed before S123A instead of after S126A such that processing returns to S127A after S126A. In this case, if the loop variable i is "0" in S127A, processing proceeds to 128A. If the loop variable i is not "0" in S127A, processing proceeds to S123A.

In S128A, the scalar multiple point output unit 123 performs a subtraction of the constant value $2^r G$ from the scalar multiplication variable R, and outputs a value of the scalar multiplication variable R obtained by the subtraction to the electronic signature generation unit 110 as the scalar multiple point kG.

S128A completes the elliptic scalar multiplication process.

In the elliptic scalar multiplication process (FIG. 4) described above, the specific point G, instead of the infinite point "0", is set as the initial value of the scalar multiplication variable R (S121A), and the constant value $2^t G$ corresponding to the initial value is finally subtracted from the scalar multiplication variable R (S128A).

With this arrangement, the scalar multiple point kG can be calculated in a fixed amount of computation time regardless of the value of the random number k. For example, even if the most significant bit of the random number k is "1" or even if a plurality of bits of the random number k are "0" consecutively from the most significant bit, the amount of computation time required for calculating the scalar multiple point kG does not vary.

That is, the elliptic scalar multiplication process is performed in a fixed amount of computation time regardless of the value of the random number k, so that the elliptic scalar multiplication process is not targeted by timing analysis. Timing analysis is a technique of identifying processed data by analyzing a time difference in processing times. Timing analysis is discussed in Non-Patent Literature 1.

Therefore, the random number k used in the elliptic scalar multiplication process cannot be identified by timing analysis, and the electronic signature is not divulged based on the random number k.

Figure 5:
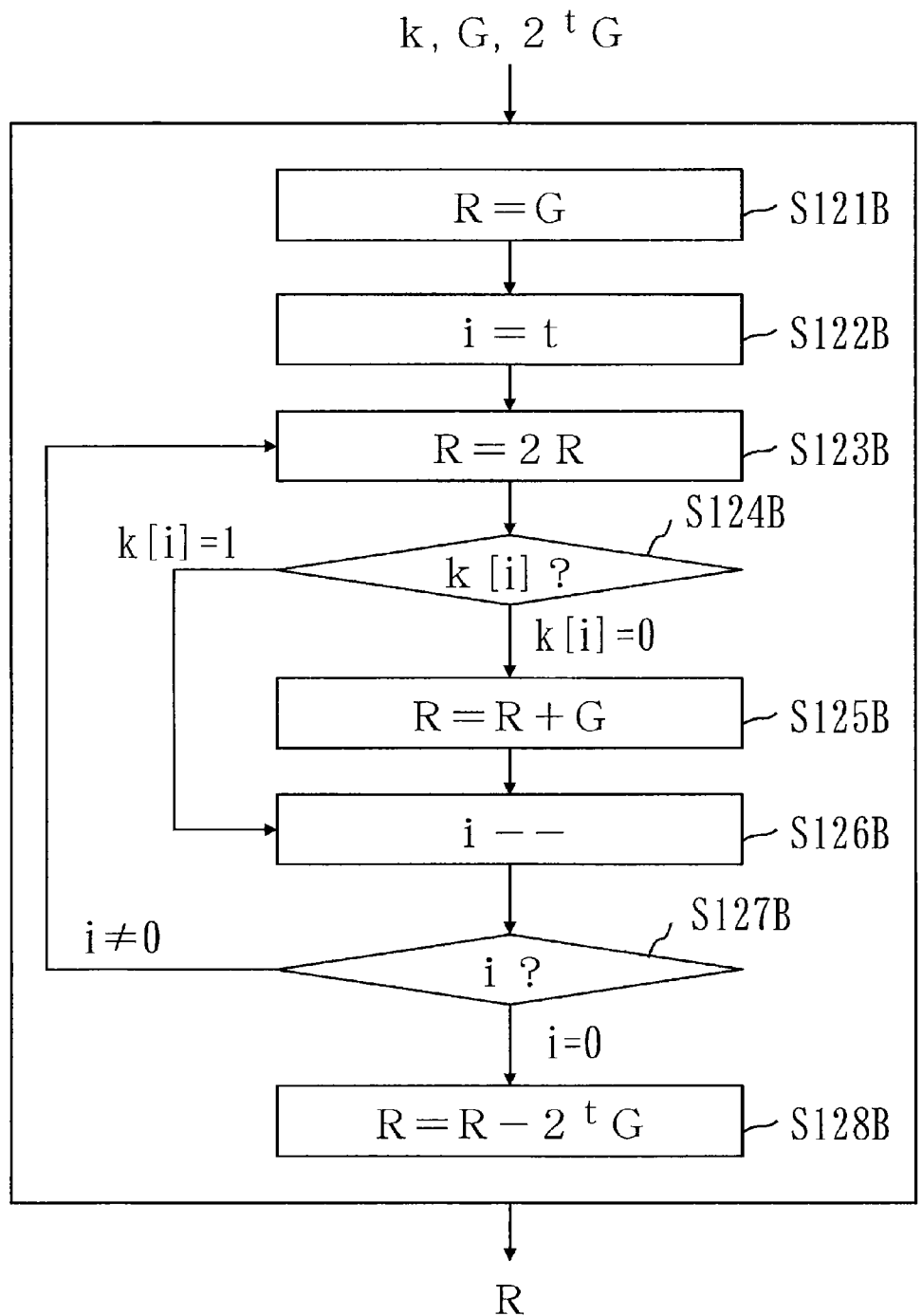
FIG. 5 is a flowchart illustrating another example of the elliptic scalar multiplication method in the first embodiment.

FIG. 5 is a flowchart illustrating another example of the elliptic scalar multiplication method in the first embodiment.

The elliptic scalar multiplication unit 120 may calculate the scalar multiple point kG by the method shown in FIG. 5.

The elliptic scalar multiplication unit 120 inputs from the electronic signature generation unit 110 the random number k and the specific point G, inputs from the apparatus storage unit 190 the constant value $2^t G$ and calculates the scalar multiple point kG as described below.

In S121B, the initial setting unit 121 sets the specific point G in the scalar multiplication variable R.

After S121B, processing proceeds to S122B.

In S122B, the scalar multiplication unit 122 sets the bit count t of the bit sequence representing the random number k in the loop variable i.

After S122B, processing proceeds to S123B.

In S123B, the scalar multiplication unit 122 doubles the scalar multiplication variable R.

After S123B, processing proceeds to S124B.

In S124B, based on the loop variable i, the scalar multiplication unit 122 references the bit value k[i] of the i-th bit from the least significant bit of the random number k, and determines whether the bit value k[i] referenced is either "0" or "1".

If the bit value k[i] is "0", processing proceeds to S125B.
If the bit value k[i] is "1", processing proceeds to S126B.

In S125B, the scalar multiplication unit 122 adds the specific point G to the scalar multiplication variable R.

After S125B, processing proceeds to S126B.

In S126B, the scalar multiplication unit 122 subtracts "1" from the loop variable i.

After S126B, processing proceeds to S127B.

In S127B, the scalar multiplication unit 122 determines whether or not the loop variable i is "0".

If the loop variable i is "0", processing proceeds to S128B.
If the loop variable i is not "0", processing returns to S123B.

However, it may be arranged that the determination of S127B is performed before S123B instead of after S126B such that processing returns to S127B after S126B. In this case, if the loop variable i is "0" in S127B, processing proceeds to S128B. If the loop variable i is not "0" in S127B, processing proceeds to S123B.

In S128B, the scalar multiple point output unit 123 performs a subtraction of the constant value $2^t G$ from the scalar multiplication variable R, and outputs a value of the scalar multiplication variable R obtained by the subtraction to the electronic signature generation unit 110 as the scalar multiple point kG.

S128B completes the elliptic scalar multiplication process.

In the elliptic scalar multiplication process (FIG. 5) described above, the scalar multiplication variable R is doubled (2R) in S123B. There is a difference in computation time between doubling the infinite point "0" and doubling a value other than the infinite point "0".

However, the specific point G, instead of the infinite point "0", is initially set in the scalar multiplication variable R in S121B. Thus, even if a plurality of bits of the random number k are "0" consecutively from the most significant bit, the infinite point "0" is not doubled in S123B. That is, the computation time in S123B does not vary depending on the value of the random number k.

Therefore, since the computation time in S123B does not vary depending on the value of the random number k, this can make it more difficult to perform timing analysis of the elliptic scalar multiplication process.

Figure 6:
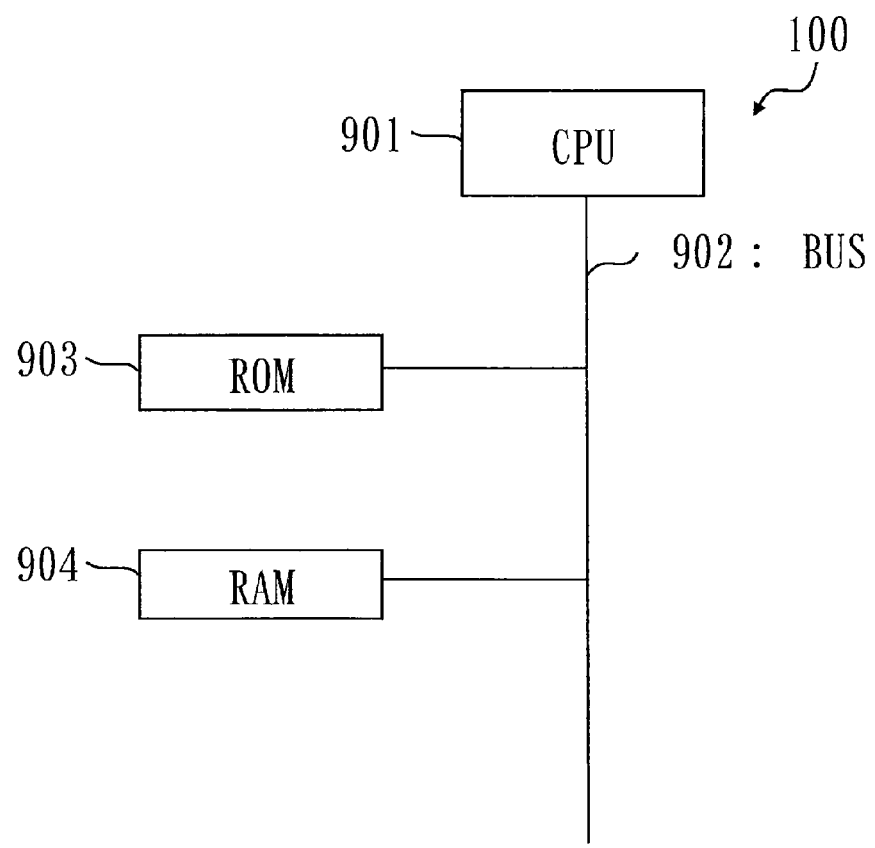
FIG. 6 is a diagram illustrating an example of hardware resources of the elliptic curve cryptographic apparatus 100 in the first embodiment.

FIG. 6 is a diagram showing an example of hardware resources of the elliptic curve cryptographic apparatus 100 in the first embodiment.

In FIG. 6, the elliptic curve cryptographic apparatus 100 includes a CPU 901 (Central Processing Unit). The CPU 901 is connected with a ROM 903 and a RAM 904 via a bus 902, and controls these hardware devices.

The ROM 903 or RAM 904 stores an OS (operating system), programs, and files.

The programs include programs for executing each function described as ". . . unit" in the embodiment. The programs are read and executed by the CPU 901. That is, each program makes a computer function as ". . . unit" or execute a procedure or a method of ". . . unit".

The files include various types of data (inputs, outputs, determination results, computation results, processing results, and so on) used in each ". . . unit" described in the embodiment.

In the embodiment, arrows included in the configuration diagrams and flowcharts mainly indicate inputs/outputs of data and signals.

In the embodiment, what is described as ". . . unit" may be ". . . circuit", ". . . apparatus", or ". . . equipment", and may also be ". . . step", ". . . procedure", or ". . . process". That is, what is described as ". . . unit" may be implemented as firmware, software, hardware, or a combination of these.

For example, the elliptic curve cryptographic apparatus 100 is configured as an IC chip, and is mounted on a portable terminal or an IC card having an electronic payment function. Personal information is pre-stored in the IC chip.

When the portable terminal or the IC card uses the electronic payment function, the elliptic curve cryptographic apparatus 100 generates an electronic signature of the personal information. Then, a wireless communication function of the portable terminal or the IC card sends the personal information and the electronic signature to a predetermined electronic payment apparatus. The electronic payment apparatus verifies the electronic signature, and processes electronic payment based on the personal information.

When the elliptic curve cryptographic apparatus 100 is configured with a computer such as a personal computer or a server device, the elliptic curve cryptographic apparatus 100 includes, in addition to the ROM 903 and the RAM 904, hardware components such as a communication board, a display device, a keyboard, a mouse, a drive device, and a magnetic disk device. The CPU 901 also controls these hardware components.

In the first embodiment, the elliptic curve cryptographic apparatus 100 may be other than the cryptographic apparatus that generates an electronic signature. The elliptic scalar multiplication process (FIGS. 4, 5) may be executed in an arithmetic process other than the process to generate an electronic signature.

That is, the elliptic scalar multiplication process (FIGS. 4, 5) in the first embodiment may be used in any arithmetic process using the elliptic scalar multiple point kG (k may be other than a random number).

The elliptic scalar multiplication process shown in FIG. 4 or FIG. 5 is a modular exponentiation operation method called a binary method. Other types of modular exponentiation operation method (for example, a Comb method) may be used as the elliptic scalar multiplication process. When the Comb method is used, the loop count can be made smaller than t by referencing a plurality of bits instead of 1 bit of k[i] simultaneously in FIG. 4 or FIG. 5.

Even when other types of modular exponentiation operation method are used, it may be arranged that the specific point G is set as the initial value of the scalar multiplication variable R (see S121A of FIG. 4) and the constant value $2^rG$ is finally subtracted from the scalar multiplication variable R. With this arrangement, the scalar multiple point kG can be calculated in a fixed amount of computation time regardless of the value of the random number k.

Second Embodiment

An embodiment in which a residue operation of a multiple-precision integer is performed in a fixed amount of computation time will be described.

The residue operation of a multiple-precision integer is a process of calculating a remainder of dividing the multiple-precision integer by a specific value.

Features different from the first embodiment will be mainly described hereinafter. Features for which description is omitted are substantially the same as in the first embodiment.

Figure 7:
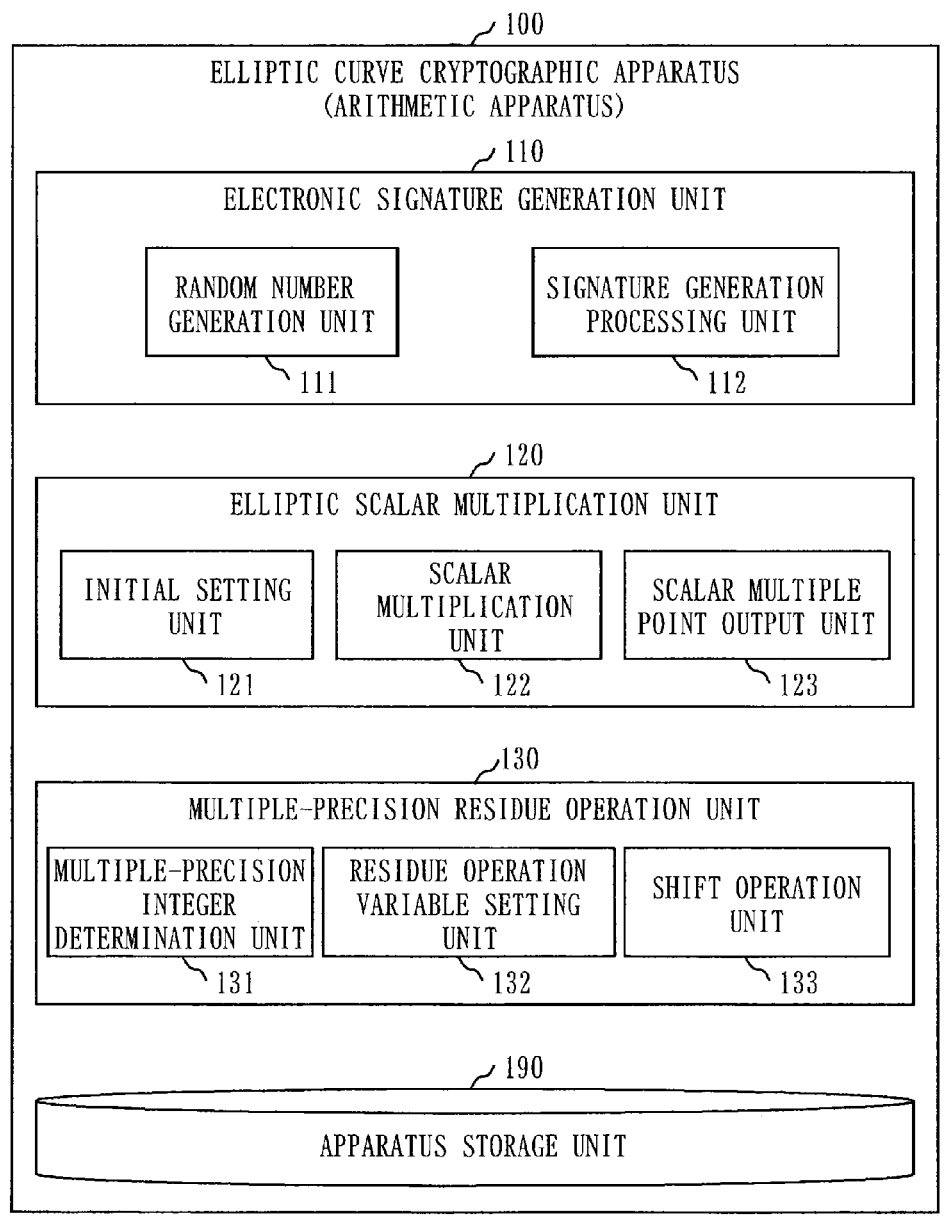
FIG. 7 is a configuration diagram of the elliptic curve cryptographic apparatus 100 in a second embodiment.

FIG. 7 is a configuration diagram of the elliptic curve cryptographic apparatus 100 in a second embodiment.

Referring to FIG. 7, a configuration of the elliptic curve cryptographic apparatus 100 in the second embodiment will be described.

In addition to the configuration described in the first embodiment, the elliptic curve cryptographic apparatus 100 includes a multiple-precision residue operation unit 130.

The multiple-precision residue operation unit 130 calculates as a residue value r a remainder that is obtained when a value obtained by dividing a specific multiple-precision integer a by two is divided by a specific prime number p.

The multiple-precision residue operation unit 130 includes a multiple-precision integer determination unit 131, a residue operation variable setting unit 132, and a shift operation unit 133.

The multiple-precision integer determination unit 131 sets 0 in a predetermined temporary variable temp if the multiple-precision integer a is even, and sets the prime number p in the temporary variable temp if the multiple-precision integer a is odd.

The residue operation variable setting unit 132 performs an addition of the temporary variable temp to the multiple-precision integer a, and sets a value obtained by the addition in a predetermined residue operation variable c.

The shift operation unit 133 performs a right shift of the residue operation variable c by 1 bit, and outputs a value obtained by the right shift as the residue value r.

The initial setting unit 121 of the elliptic scalar multiplication unit 120 sets a multiple-precision integer representing the coordinate value G of the specific point in the scalar multiplication variable R (S121A of FIG. 4).

Using the multiple-precision residue operation unit 130, the scalar multiplication unit 122 calculates a coordinate value "2R" obtained by doubling the scalar multiplication variable R (S123A of FIG. 4).

Using the multiple-precision residue operation unit 130, the scalar multiplication unit 122 calculates a coordinate value "R[0]+G" obtained by adding the coordinate value G of the specific point to the zeroth work variable R[0] (S124A of FIG. 4).

Using the multiple-precision residue operation unit 130, the scalar multiple point output unit 123 calculates a coordinate value "R-$2^rG$" obtained by subtracting the coordinate value $2^rG$ from the scalar multiplication variable R (S128A of FIG. 4).

The coordinate value G of the specific point will be hereinafter described as the "specific point G", and the coordinate value $2^rG$ will be described as the "constant value $2^rG$".

Figure 8:
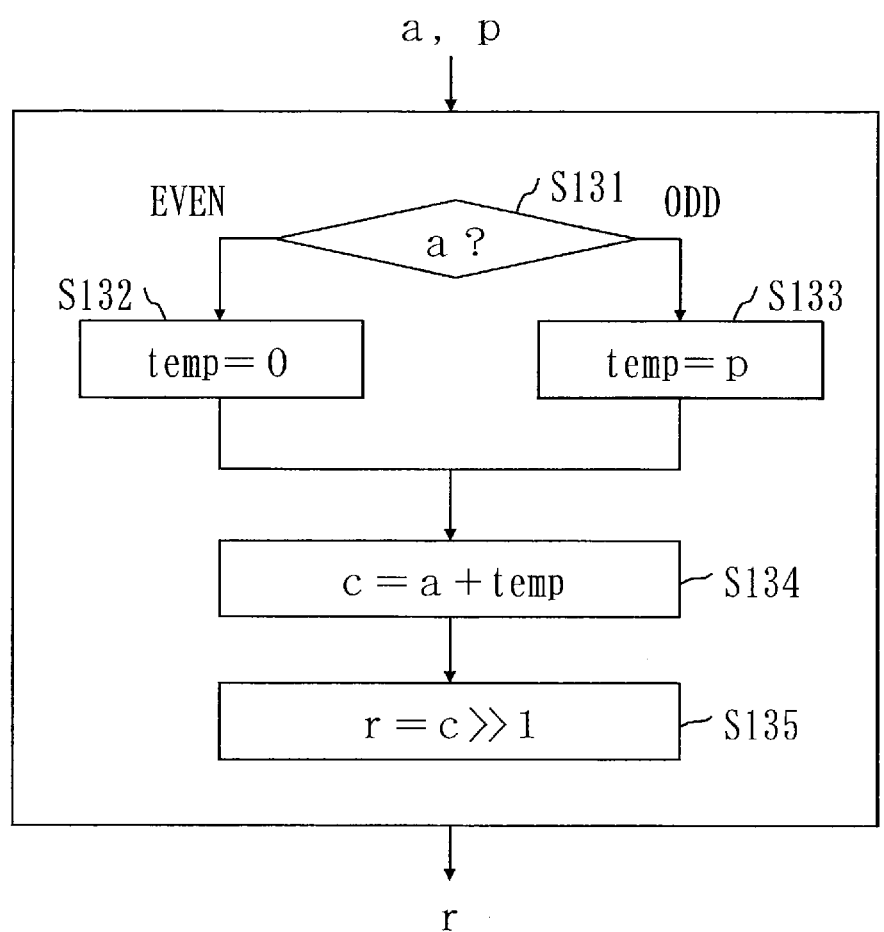
FIG. 8 is a flowchart illustrating a multiple-precision residue operation method in the second embodiment.

FIG. 8 is a flowchart illustrating a multiple-precision residue operation method in the second embodiment.

Referring to FIG. 8, the multiple-precision residue operation method in the second embodiment will be described.

In a cryptographic process such as generation or verification of an electronic signature or other types of cryptographic process, a multiple-precision integer is used and an arithmetic process using a multiple-precision integer is performed to make it more difficult to break encryption.

A multiple-precision integer is an integer value larger than the maximum integer value that can be represented by a predetermined number of bits corresponding to the data size of a register. For example, in a 32-bit machine, an integer value larger than the maximum integer value that can be expressed by 32 bits ((2 to the power of 32) −1) is a multiple-precision integer.

The arithmetic process using a multiple-precision integer will be hereinafter referred to as the "multiple-precision operation process".

Generally, in the multiple-precision operation process, a multiple-precision residue operation is performed.

The multiple-precision residue operation is a process of obtaining a remainder ("r" to be described later) by dividing a multiple-precision integer ("a" to be described later) by a specific value ("p" to be described later).

The coordinate value of the specific point G on the elliptic curve described in the first embodiment is an example of a multiple-precision integer.

For example, the elliptic scalar multiplication unit 120 invokes the multiple-precision residue operation unit 130 in S123A, S124A, and S128A (see FIG. 4), and the multiple-precision residue operation unit 130 executes the multiple-precision residue operation shown in FIG. 8.

The multiple-precision integer to be computed will be hereinafter described as "a", the value that devices "a/2" will be described as "p", and the remainder obtained by dividing "a/2" by "p" will be described as the "residue value r". "a/2" is a value obtained by dividing the multiple-precision integer a by two. "p" is a prime number. The residue value r is an integer value equal to or greater than 0 and less than p.

In S131, the multiple-precision integer determination unit 131 determines whether the multiple-precision integer a is an even or odd value.

If the multiple-precision integer a is even, processing proceeds to S132.

If the multiple-precision integer a is odd, processing proceeds to S133.

In S132, the multiple-precision integer determination unit 131 sets "0" in a predetermined variable temp. The variable temp will be hereinafter referred to as the "temporary variable temp".

After S132, processing proceeds to S134.

In S133, the multiple-precision integer determination unit 131 sets the prime number p in the temporary variable temp.

After S133, processing proceeds to S134.

In S134, the residue operation variable setting unit 132 performs an addition of the value of the temporary variable temp to the multiple-precision integer a, and sets a value obtained by the addition in a predetermined variable c. The variable c will be hereinafter referred to as the "residue operation variable c".

After S134, processing proceeds to S135.

In S135, the shift operation unit 133 performs a right shift of a bit sequence representing the residue operation variable c by 1 bit, and outputs a value obtained by the right shift as the residue value r.

The residue value r is a remainder obtained by dividing "a/2" by "p", and can be expressed by a formula "r=a/2 mod p".

S135 completes the multiple-precision residue operation process.

In the multiple-precision residue operation process (FIG. 8) described above, the number of processing steps does not vary depending on whether the value of the multiple-precision integer a is even or odd.

For this reason, in the multiple-precision residue operation process, there is no time difference in computation time between when the multiple-precision integer a is even and when the multiple-precision integer a is odd. That is, the multiple-precision residue operation process is performed in a fixed amount of computation time regardless of the value of the multiple-precision integer a, so that the multiple-precision residue operation process is not targeted by timing analysis.

Therefore, the multiple-precision integer a cannot be identified by timing analysis, and secret information such as the random number k and the electronic signature is not divulged based on the multiple-precision integer a.

In the second embodiment, the elliptic curve cryptographic apparatus 100 may be other than the cryptographic apparatus that generates an electronic signature, and the multiple-precision residue operation process (FIG. 8) may be executed as a multiple-precision operation process included in a process other than the process of generating an electronic signature.

That is, the multiple-precision residue operation process (FIG. 8) in the second embodiment may be used for any arithmetic process using a multiple-precision integer such as a process of verifying an electronic signature, a cryptographic process not involving an electronic signature, a cryptographic process other than elliptic curve cryptography, or an arithmetic process other than a cryptographic process.

Third Embodiment

An embodiment in which zero determination of a multiple-precision integer is performed in a fixed amount of computation time will be described.

The zero determination of a multiple-precision integer is a process that determines whether the value of the multiple-precision integer is either zero or non-zero.

Features which are different from the first and second embodiments will be mainly described hereinafter. Features for which description is omitted are substantially the same as in the first and second embodiments.

Figure 9:
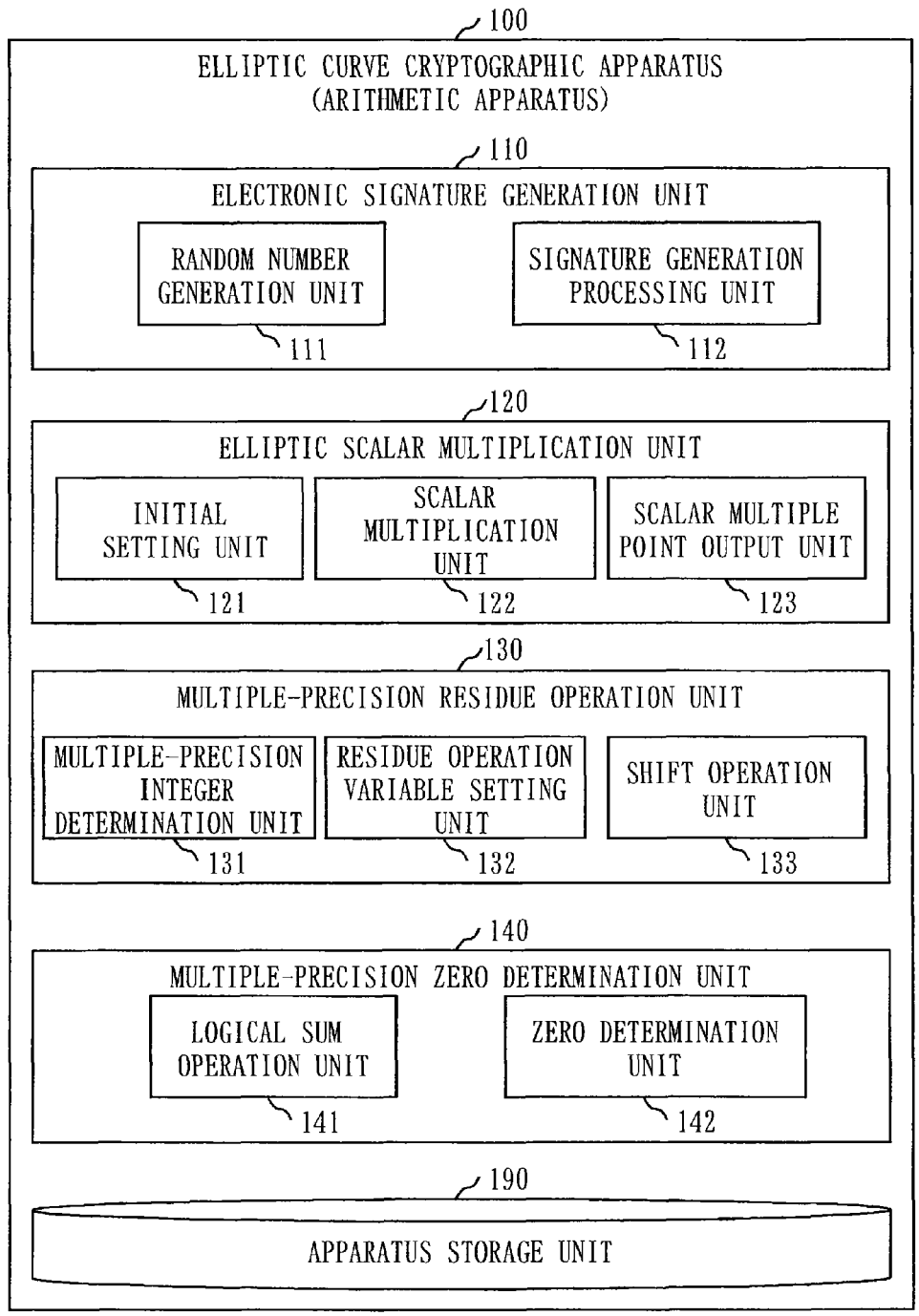
FIG. 9 is a configuration diagram of the elliptic curve cryptographic apparatus 100 in a third embodiment.

FIG. 9 is a configuration diagram of the elliptic curve cryptographic apparatus 100 in a third embodiment.

Referring to FIG. 9, a configuration of the elliptic curve cryptographic apparatus 100 in the third embodiment will be described.

In addition to the configuration described in the second embodiment, the elliptic curve cryptographic apparatus 100 includes a multiple-precision zero determination unit 140.

The multiple-precision zero determination unit 140 determines whether or not a specific multiple-precision integer b is zero, the specific multiple-precision integer b being represented by a concatenation of a plurality of integer values.

The multiple-precision zero determination unit 140 includes a logical sum operation unit 141 and a zero determination unit 142.

The logical sum operation unit 141 calculates a logical sum of the plurality of integer values (words) representing the multiple-precision integer b.

Based on the logical sum calculated by the logical sum operation unit 141, the zero determination unit 142 determines whether or not the multiple-precision integer b is zero.

The initial setting unit 121 of the elliptic scalar multiplication unit 120 sets the multiple-precision integer representing the coordinate value G of the specific point in the scalar multiplication variable R (S121A of FIG. 4).

Using the multiple-precision zero determination unit 140, the scalar multiplication unit 122 calculates a coordinate value "2R" obtained by doubling the scalar multiplication variable R (S123A of FIG. 4).

Using the multiple-precision zero determination unit 140, the scalar multiplication unit 122 calculates a coordinate value "R[0]+G" obtained by adding the coordinate value G of the specific point to the zeroth work variable R[0] (S124A of FIG. 4).

Using the multiple-precision zero determination unit 140, the scalar multiple point output unit 123 calculates a coordinate value "R-2ʳG" obtained by subtracting the coordinate value 2ʳG from the scalar multiplication variable R (S128A of FIG. 4).

The coordinate value G of the specific point will be hereinafter described as the "specific point G", and the coordinate value 2ʳG will be described as the "constant value 2ʳG".

Figure 10:
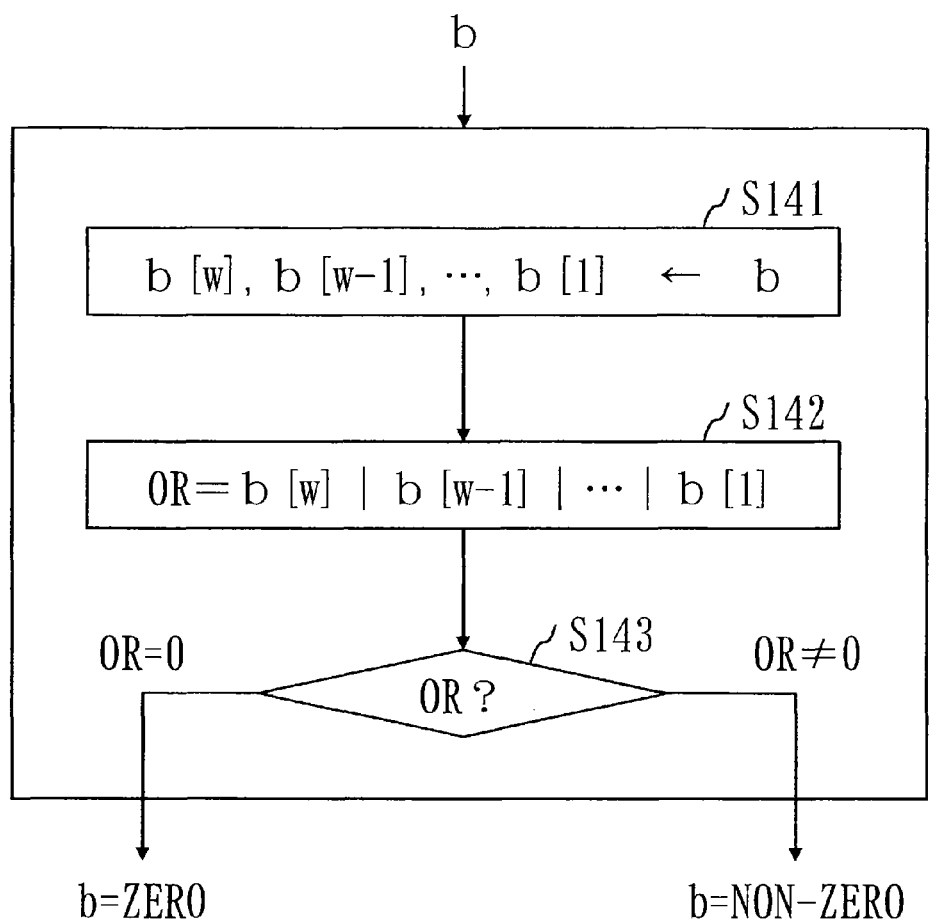
FIG. 10 is a flowchart illustrating a multiple-precision zero determination method in the third embodiment.

FIG. 10 is a flowchart illustrating a multiple-precision zero determination method in the third embodiment.

Referring to FIG. 10, the multiple-precision zero determination method in the third embodiment will be described.

Generally, in the multiple-precision operation process, a multiple-precision zero determination process is performed.

The multiple-precision zero determination process is a process that determines whether the value of the multiple-precision integer b is either zero or non-zero.

The coordinate value of the specific point G on the elliptic curve described in the first embodiment is an example of a multiple-precision integer.

For example, the elliptic scalar multiplication unit 120 invokes the multiple-precision zero determination unit 140 in S123A, S124A, and S128A (see FIG. 4), and the multiple-precision zero determination unit 140 executes the multiple-precision zero determination process shown in FIG. 10.

In S141, the logical sum operation unit 141 divides the multiple-precision integer b into units of a predetermined number of digits (or bits). For example, the logical sum operation unit 141 divides the multiple-precision integer b of 100 digits into ten integer values of ten digits each. As another example, the logical sum operation unit 141 divides the multiple-precision integer b of 96 bits into three bit sequences of 32 bits each.

A plurality of integer values obtained by dividing the multiple-precision integer b or a plurality of integer values represented by a plurality of bit sequences obtained by dividing the multiple-precision integer b will be hereinafter referred to as "words".

The number of words (number of divided units) of the multiple-precision integer b will be described as "w", and the i-th word from the least significant word will be described as b[i]. That is, the most significant word (first word) will be described as b[w], and the least significant word (last word) will be described as b[1].

After S141, processing proceeds to S142.

In S142, the logical sum operation unit 141 calculates a logical sum of the plurality of words of the multiple-precision integer b obtained in S141, and sets the calculated logical sum in a predetermined variable OR. The variable OR will be hereinafter referred to as the "logical sum OR". In the embodiment, "A|B" means a logical sum of A and B.

Thus, if all of the plurality of words constituting the multiple-precision integer b have the value of "0", the logical sum OR has the value of "0". If at least any one of the plurality of words constituting the multiple-precision integer b does not have the value of "0", the logical sum OR has the value of "1".

After S142, processing proceeds to S143.

In S143, the zero determination unit 142 determines whether the value of the logical sum OR set in S142 is either "0" or "1".

If the value of the logical sum OR is "0", the zero determination unit 142 determines that the value of the multiple-precision integer b is zero and outputs the determination result.

If the value of the logical sum OR is not "0", the zero determination unit 142 determines that the value of the multiple-precision integer b is other than zero (non-zero) and outputs the determination result.

S143 completes the multiple-precision zero determination process.

In the multiple-precision zero determination process (FIG. 10) described above, the number of processing steps remains the same regardless of the value of the multiple-precision integer b.

For this reason, in the multiple-precision zero determination process, there is no time difference in computation time depending on the value of the multiple-precision integer b. That is, the multiple-precision zero determination process is performed in a fixed amount of computation time regardless of the value of the multiple-precision integer b, so that the multiple-precision zero determination process is not targeted by timing analysis.

Therefore, the multiple-precision integer b cannot be identified by timing analysis, and secret information such as the random number k and the electronic signature is not divulged based on the multiple-precision integer b.

In the third embodiment, the elliptic curve cryptographic apparatus 100 may be other than the cryptographic apparatus that generates an electronic signature, and the multiple-precision zero determination process (FIG. 10) may be executed as a multiple-precision operation process included in a process other than the process of generating an electronic signature.

That is, the multiple-precision zero determination process (FIG. 10) in the third embodiment may be used in any arithmetic process using a multiple-precision integer, such as a process of verifying an electronic signature, a cryptographic process not involving an electronic signature, a cryptographic process other than elliptic curve cryptography, or an arithmetic process other than a cryptographic process.

List Of Reference Signs

100: elliptic curve cryptographic apparatus, 110: electronic signature generation unit, 111: random number generation unit, 112: signature generation processing unit, 120: elliptic scalar multiplication unit, 121: initial setting unit, 122: scalar multiplication unit, 123: scalar multiple point output unit, 130: multiple-precision residue operation unit, 131: multiple-precision integer determination unit, 132: residue operation variable setting unit, 133: shift operation unit, 140: multiple-precision zero determination unit, 141: logical sum operation unit, 142: zero determination unit, 190: apparatus storage unit, 901: CPU, 902: bus, 903: ROM, 904: RAM

The invention claimed is:

1. An apparatus that calculates a coordinate value kG, for a cryptographic digital signature, obtained by scalar multiplication of a coordinate value G of a specific point included in an elliptic curve by a multiplier value k represented by a t-bit bit sequence, the apparatus comprising:

circuitry configured to implement a constant storage unit that pre-stores a coordinate value $2^t G$ obtained by scalar multiplication of the coordinate value G of the specific point by 2 to a power of t;

an initial setting unit that sets the coordinate value G of the specific point in a scalar multiplication variable R;

a scalar multiplication unit that references the t-bit bit sequence representing the multiplier value k in units of a predetermined number of bits from a most significant bit, and each time the predetermined number of bits of the bit sequence are referenced, sets in a zeroth work variable R[0] a coordinate value obtained by doubling the scalar multiplication variable R, sets in a first work variable R[1] a coordinate value obtained by adding a coordinate value of multiplying the coordinate value G of the specific point by a predetermined number to the coordinate value set in the zeroth work variable R[0], sets the zeroth work variable R[0] in the scalar multiplication variable R if a value of the predetermined number of bits referenced is zero, and sets the first work variable R[1] in the scalar multiplication variable R if the value of the predetermined number of bits referenced is non-zero;

a scalar multiple point output unit that performs a subtraction of the coordinate value $2^t G$ stored in the constant storage unit from the scalar multiplication variable R set by the scalar multiplication unit, and outputs a coordinate value kG for the cryptographic digital signature, obtained by the subtraction; and a multiple-precision residue operation unit that calculates as a residue value r, a remainder that is obtained when a value obtained by dividing a multiple-precision integer a by two is divided by a prime number p, the multiple-precision residue operation unit setting 0 in a temporary variable temp if the multiple-precision integer a is even, setting the prime number p in the temporary variable temp if the multiple-precision integer a is odd, setting in a residue operation variable c a value obtained by adding the temporary variable temp to the multiple-precision integer a, and outputting as the residue value r, a value obtained by right-shifting by 1 bit the residue operation variable c that is set, wherein the initial setting unit sets a multiple-precision integer representing the coordinate value G of the specific point in the scalar multiplication variable R;

wherein the scalar multiplication unit, using operations of the multiple-precision residue operation unit, calculates the coordinate value obtained by doubling the scalar multiplication variable R and the coordinate value obtained by adding the coordinate value G of the specific point to the zeroth work variable R[0]; and wherein the scalar multiple point output unit, using operations of the multiple-precision residue operation unit, calculates the coordinate value kG for the cryptographic digital signature, obtained by subtracting the coordinate value $2^r G$ from the scalar multiplication variable R.

2. The apparatus according to claim 1,
wherein the circuitry further implements
a multiple-precision zero determination unit that determines whether or not a multiple-precision integer b represented by a concatenation of a plurality of integer values is zero, the multiple-precision zero determination unit calculating a logical sum of the plurality of integer values representing the multiple-precision integer b and determining whether or not the multiple-precision integer b is zero based on the logical sum calculated, wherein the scalar multiplication unit, using the multiple-precision residue operation unit and the multiple-precision zero determination unit, calculates the coordinate value obtained by doubling the scalar multiplication variable R and the coordinate value obtained by adding the coordinate value G of the specific point to the zeroth work variable R[0], and wherein the scalar multiple point output unit, using operations of the multiple-precision residue operation unit and the multiple-precision zero determination unit, calculates the coordinate value obtained by subtracting the coordinate value $2^r G$ from the scalar multiplication variable R.

3. The apparatus according to claim 1,
wherein the circuitry further implements
an electronic signature generation unit that generates a random value to be used as the multiplier value k, and generates an electronic signature by using the coordinate value kG output by the scalar multiple point output unit.

4. An elliptic curve cryptographic apparatus for generating an electronic signature using an elliptic curve cryptographic scheme, comprising:
circuitry configured to
obtain the coordinate value kG calculated by the apparatus of claim 1, and
generate the electronic signature based on the obtained coordinate value kG.

5. An elliptic scalar multiplication method of an apparatus that calculates a coordinate value kG, for a cryptographic digital signature, obtained by scalar multiplication of a coordinate value G of a specific point included in an elliptic curve by a multiplier value k represented by a t-bit bit sequence, wherein the apparatus includes circuitry implementing an initial setting unit, a scalar multiplication unit, a scalar multiple point output unit, and a multiple-precision residue operation unit, comprising:
calculating, by the multiple-precision residue operation unit, as a residue value r, a remainder that is obtained when a value obtained by dividing a multiple-precision integer a by two is divided by a prime number p, set 0 in a temporary variable temp if the multiple-precision integer a is even, set the prime number p in the temporary variable temp if the multiple-precision integer a is odd, set in a residue operation variable c a value obtained by adding the temporary variable temp to the multiple-precision integer a, and output as the residue value r, a value obtained by right-shifting by 1 bit the residue operation variable c that is set, setting, by the initial setting unit, a multiple-precision integer representing the coordinate value G of the specific point in a scalar multiplication variable R;

referencing, by the scalar multiplication unit, the t-bit bit sequence representing the multiplier value k in units of a predetermined number of bits from a most significant bit; and each time the predetermined number of bits of the bit sequence are referenced,
calculating, by using the multiple-precision residue operation unit, a first coordinate value obtained by doubling the scalar multiplication variable R,
setting the first coordinate value calculated in a zeroth work variable R[0],
calculating by using the multiple-precision residue operation unit a second coordinate value obtained by adding a coordinate value of multiplying the coordinate value G of the specific point by a predetermined number to the first coordinate value set in the zeroth work variable R[0],
setting the second coordinate value calculated in a first work variable R[1],
setting the zeroth work variable R[0] in the scalar multiplication variable R if a value of the predetermined number of bits referenced is zero, and
setting the first work variable R[1] in the scalar multiplication variable R if the value of the predetermined number of bits referenced is non-zero;

calculating, by the scalar multiple point output unit, using operations of the multiple-precision residue operation unit, a third coordinate value obtained by subtracting a constant value $2^r G$ obtained by scalar multiplication of the coordinate value G of the specific point by 2 to a power of t from the scalar multiplication variable R set by the scalar multiplication unit; and outputting the calculated third coordinate value as the coordinate value kG for the cryptographic digital signature.

6. An apparatus for generation of a cryptographic digital signature by calculating, as a residue value r, a remainder that is obtained when a value obtained by dividing a multiple-precision integer a by two is divided by a prime number p, the apparatus comprising:
circuitry configured to implement
a multiple-precision integer determination unit that sets 0 in a temporary variable temp if the multiple-precision integer a is even, and sets the prime number p in the temporary variable temp if the multiple-precision integer a is odd,
a residue operation variable setting unit that performs an addition of the temporary variable temp to the multiple-precision integer a, and sets a value obtained by the addition in a residue operation variable c, and
a shift operation unit that performs a right shift of the residue operation variable c by 1 bit, and outputs a value obtained by the right shift as the residue value r.

7. An elliptic curve cryptographic apparatus for generating an electronic signature using an elliptic curve cryptographic scheme, comprising:
   circuitry configured to obtain the residue value r calculated by the apparatus of claim 6, and
   generate the electronic signature based on the obtained residue value r.

8. A method for generation of a cryptographic digital signature by implementation of a residue operation method of an apparatus that calculates, as a residue value r, a remainder that is obtained when a value obtained by dividing a multiple-precision integer a by two is divided by a prime number p, the residue operation method comprising:
   by circuitry configured to implement a multiple-precision integer determination unit, setting 0 in a temporary variable temp if the multiple-precision integer a is even, and setting the prime number p in the temporary variable temp if the multiple-precision integer a is odd;
   by the circuitry configured to implement a residue operation variable setting unit, performing an addition of the temporary variable temp to the multiple-precision integer a, and setting a value obtained by the addition in a residue operation variable c; and
   by the circuitry configured to implement a shift operation unit, performing a right shift of the residue operation variable c by 1 bit, and outputting a value obtained by the right shift as the residue value r.

* * * * *